Dec. 16, 1969   G. D. LEWIS ET AL   3,483,698
COMBUSTION INSTABILITY REDUCTION DEVICE
Filed Nov. 22, 1966   2 Sheets-Sheet 1
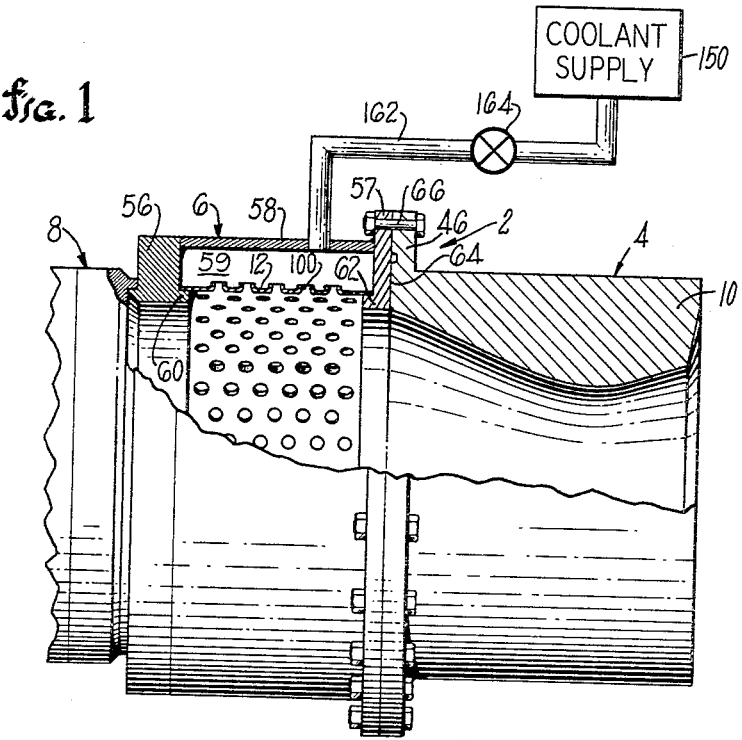
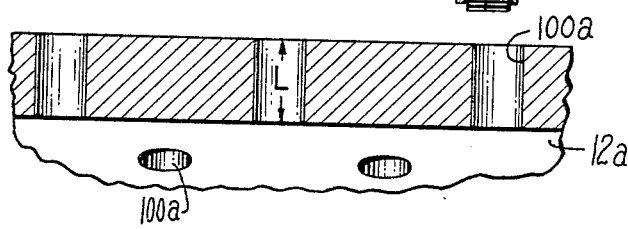
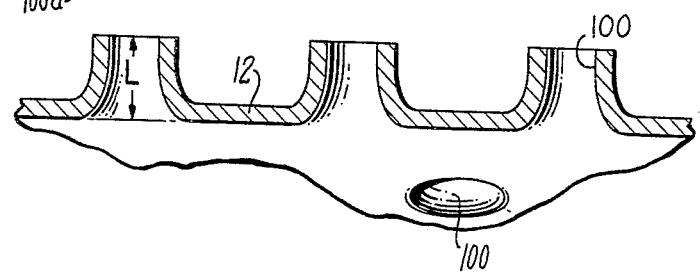
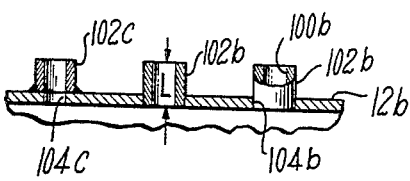
INVENTORS
GEORGE D. LEWIS
HARVEY J. FORD
BY Jack N. M<sup>c</sup>Carthy
AGENT United States Patent Office 3,483,698
Patented Dec. 16, 1969

3,483,698
COMBUSTION INSTABILITY REDUCTION DEVICE
George D. Lewis, North Palm Beach, and Harvey J. Ford, Jupiter, Fla., assignors to United Aircraft Corporation, East Hartford, Conn., a corporation of Delaware
Filed Nov. 22, 1966, Ser. No. 596,324
Int. Cl. F02g 3/00
U.S. Cl. 60—39.72                    3 Claims

ABSTRACT OF THE DISCLOSURE

A device for increasing combustion stability in an engine combustion chamber wherein the combustion chamber has a plurality of openings therein with each opening having a tubular projection extending radially outward to extend the length of the openings. A solid cylindrical wall extends around said combustion chamber to form an annular chamber into which said projections extend.

---

This invention relates to a combustion instability reduction device and particularly for the reduction of instability which may develop in the combustion chamber of a rocket engine or jet engine.

One object of this invention is to provide improved acoustic damping adjacent the walls of a chamber.

Another object of this invention is to provide a combustion chamber having walls formed with holes therethrough having extensions which make the effective hole length longer than the width of the combustion chamber wall.

A further object of this invention is to provide a combustion chamber having openings therein formed by dimpling the chamber at various points in radial directions so that a plurality of short holes are made.

Another object of this invention is to provide a combustion chamber having a high absorption coefficient over a wide band of frequencies.

Other objects and advantages will be apparent from the specification and claims and from the accompanying drawings which illustrate an embodiment of the invention.

FIGURE 1 is a side view of a rocket engine, partially in section, showing the combustion chamber of the present invention and resonant chamber.

FIGURE 2 is an enlarged view showing a combustion chamber having a plurality of holes formed in the sidewall thereof in a manner which is old in the prior art, to achieve combustion stability.

FIGURE 3 is an enlarged view of a portion of FIGURE 1 showing a group of dimpled holes formed in the sidewall of the combustion chamber.

FIGURE 4 is an enlarged view showing another method of placing holes around the combustion chamber which are of greater length than the thickness of the chamber wall.

Figure 5:
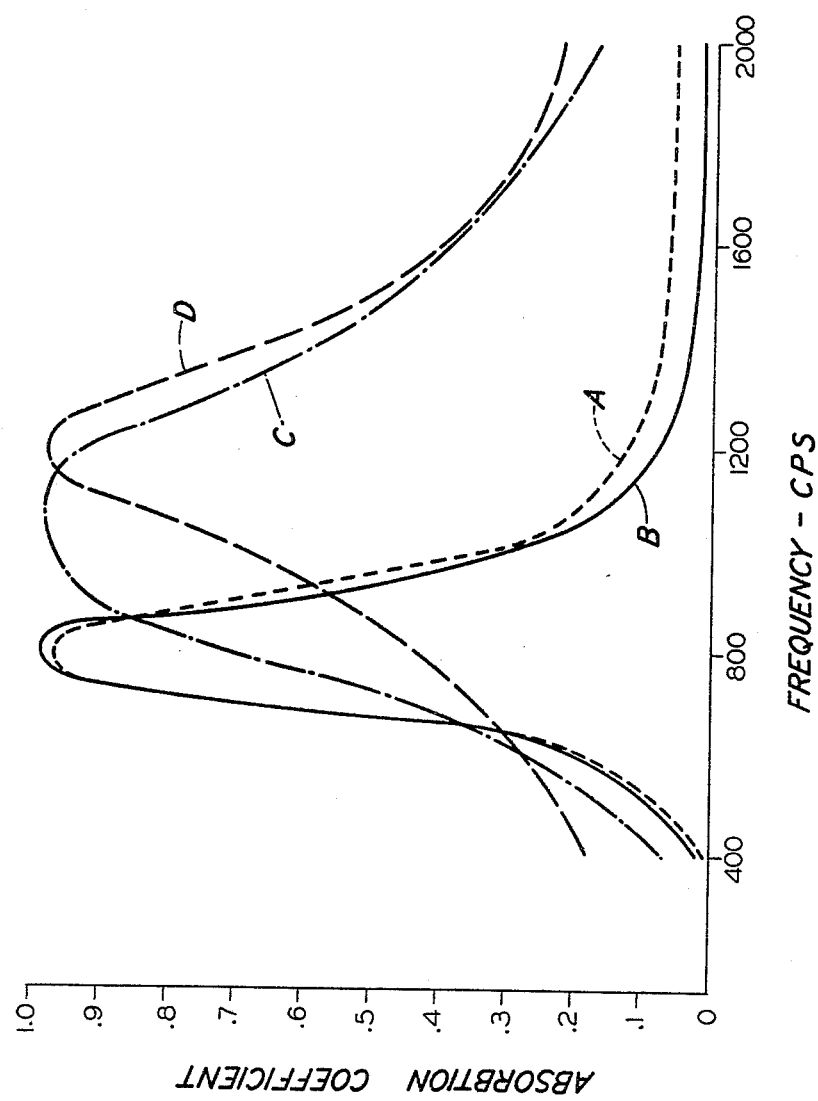
FIGURE 5 is a graph showing Absorption Coefficient plotted against Frequency.

FIGURE 1 shows a rocket engine 2 having a nozzle assembly 4, a combustion apparatus 6 and an injector head 8. The nozzle assembly 4 comprises a section 10 having the desired contour of the nozzle throat. The forward or inlet end of the nozzle assembly 4 is formed having an annular flange 46 for a purpose to be hereinafter described.

The combustion apparatus 6 comprises a cylindrical chamber wall member 12 which is fixed at its forward end to an annular member 56 and connected at its other end to an annular member 57. Annular member 56 has a rearwardly extending flange 60 at its inner edge which forms a cylindrical outer surface onto which the forward end of the wall 12 is located and fixed in place as by brazing or welding or any other satisfactory means. Annular member 57 has a forwardly extending flange 62 at its inner edge which forms a cylindrical outer surface onto which the rearward end of the wall 12 is located and fixed in place as the forward end. The annular member 57 has a rearwardly facing surface 64 which receives the forward face of the flange 46. The nozzle assembly and combustion apparatus are held together by bolts 66 which pass through the outer periphery of flange 46 and outer edge of annular member 57.

A cylindrical member 58 is placed around the outer surface of the wall member 12 and is attached at its forward end to the outer edge of the annular member 56 and at its rearward end to the flange 64 at a point located inwardly of the locations of bolts 66. This member 58 is fixed at its forward and rearward ends such as by welding or brazing or any other satisfactory means. This construction forms a resonant chamber 59, bounded by the cylindrical member 58, the inner combustion chamber absorber wall 12, and the annular members 56 and 57.

A coolant supply is connected to the chamber 59 positioned around the main combustion chamber by a conduit 162. This conduit extends through the cylindrical member 58 and opens into the chamber 59. A valve means 164 is connected in conduit 162 to control the flow of coolant from a coolant supply 150.

An injector head 8 is fixed to the forward part of the annular member 56 so that propellants can be directed therethrough into said combustion chamber for ignition therein.

A combustion instability reduction device is also shown in U.S. application Ser. No. 428,110 to Mr. George D. Lewis filed Jan. 26, 1965. This application also provides specific material for calculating details in construction. U.S. Patent No. 2,930,195 and U.S. Patent No. 2,941,356 also give more detailed information as to formula to be used in arriving at a precise construction.

In the construction of the wall member 12 (see FIG. 3), holes 100 are located therearound to provide the proper columns of air to combine with the chamber 59 to have the effect of a Helmholtz resonator. Holes 100a having a column of air L are formed in a plate having the thickness L so that the holes of a proper length are obtained merely by boring through the plate. This type of chamber having holes therein is shown as old in the two patents referred to above. Holes 100b are formed by placing short tubes 102b in holes 104b or by placing short tubes 102c over holes 104c in a wall member 12b to acquire the proper length L (see FIG. 4).

The holes in 100 are formed by dimpling the chamber so that the wall material will flare outwardly until the proper size is obtained. It may be that several different die of different sizes will be needed to finally arrive at the desired shape and length L of opening 100.

FIGURE 5 is a graph showing the results of a study made on the problem of combustion instability wherein the Absorption Coefficient is plotted against the Frequency of the test noise. A test was made on a type of wall as shown in FIGURE 2 with the thicknes of the plate material being 0.125 in. The results of this test are represented by curve A. A theoretically predicted curve of a wall formed such as FIGURE 2 was also computed and this is represented by curve B. A test was then made with a type of wall as shown in FIGURE 3 with the plate having a thickness of 0.025 in. with the holes being formed therein by extruding the plate to a length L of 0.125 in., so that the length of the holes would correspond to the length of the holes of the solid plate test piece.

First, the test piece made with a type of wall as shown in FIGURE 3 was tested with the extending portion forming the holes directed away from the sound source.

The results of this test are represented by curve C. The extensions were then positioned so that they were facing the sound source. The results of this test are represented by curve D. All of the tests were identically run to provide as accurate a finding as possible.

It is to be understood that the invention is not limited to the specific embodiments herein illustrated and described, but may be used in other ways without departure from its spirit as defined by the following claims.

We claim:
1. In combination, an engine having a combustion chamber arranged to have reduced combustion instability, said combustion chamber having a cylindrical wall with a plurality of openings therein, said wall having a chamber formed therearound including a solid cylindrical wall which extends for the length of the chamber, the openings of said wall having tubular projections extending therefrom which extend toward the solid cylindrical wall and lengthen the openings.

2. A combination as set forth in claim 1 wherein said thickness of the cylindrical wall having openings is approximately .025 inch, and the tubular projections extend the openings to a length of .125 inch.

3. A combination as set forth in claim 1 wherein said tubular projections extend the length of the openings of said cylindrical wall to approximately 5 times the thickness of the cylindrical walls.

References Cited

UNITED STATES PATENTS

| | | | |
|---|---|---|---|
| 1,693,011 | 11/1928 | Woodward | 29—163.5 |
| 2,138,383 | 11/1938 | Little | 29—163.5 |
| 2,332,543 | 10/1943 | Wilson | 181—48 |
| 2,425,645 | 8/1947 | Ryan | 29—157 |
| 2,807,931 | 10/1957 | Bodine | 60—270 |
| 2,830,359 | 4/1958 | Reinshagen | 29—163.5 |
| 2,941,356 | 6/1960 | Blackman | 60—39.72 |
| 3,286,786 | 11/1966 | Wirt | 29—163.5 |
| 3,315,761 | 4/1967 | Selig | 181—48 |

CARLTON R. CROYLE, Primary Examiner

DOUGLAS HART, Assistant Examiner